United States Patent [19]

Ceideberg

[11] Patent Number: 5,190,339
[45] Date of Patent: Mar. 2, 1993

[54] MOTOR VEHICLE SUN VISOR POSITIONER

[76] Inventor: John W. Ceideberg, P.O. Box 1296, Gardnerville, Nev. 89410

[21] Appl. No.: 901,964

[22] Filed: Jun. 22, 1992

Related U.S. Application Data

[63] Continuation-in-part of Ser. No. 796,660, Nov. 25, 1991, abandoned.

[51] Int. Cl.$^5$ ............................................. B60J 3/02
[52] U.S. Cl. .......................... 296/97.9; 160/DIG. 3; 248/323
[58] Field of Search ............ 296/97.1, 97.6, 97.8, 296/97.9–97.13; 24/17 A, 17 B, 17 AP; 248/323, 324, 343; 160/DIG. 3

[56] References Cited

U.S. PATENT DOCUMENTS 4,913,483  4/1990  Jasso ............................ 296/97.8 X
5,098,149  3/1992  Lee ................................ 296/97.6

FOREIGN PATENT DOCUMENTS 2156294  10/1985  United Kingdom .............. 296/97.6

*Primary Examiner*—Dennis H. Pedder

[57]     ABSTRACT

An attachment for the sun visor of a vehicle, the sun visor being rotatably mounted on an elongated bar for rotation about the horizontal longitudinal axis of the bar, and the elongated bar having a right-angled end portion extending into and supported in a bracket attached to the ceiling of the vehicle for rotation about a vertical axis perpendicular to the horizontal longitudinal axis of the bar. The attachment includes two bands of flexible, non-stretchable material, each having one end attached to the brackets, and the bands being looped about the distal end of the visor. The ends of the bands are attached to the bracket at respective pivot points radially spaced from the vertical axis to create movement of the band with respect to the end of the visor as the visor is turned about the second axis. An adjustable fastener is provided which inter-couples the other ends of the two bands, and which may be used to adjust the tension of the bands with respect to the visor, so that any movement of the visor about the vertical axis, after it has been set to a desired angular position, is prevented.

5 Claims, 3 Drawing Sheets

MOTOR VEHICLE SUN VISOR POSITIONER

This application is a continuation in-part of co-pending application Ser. No. 796,660 filed Nov. 25, 1991, now abandoned.

BACKGROUND OF THE INVENTION

It is usual after a period of time for the sun visor swinging assembly of a motor vehicle to become worn and loose. This means that the visor will not stay in the position to which it has been set, and the visor will swing to and fro with the motion of the motor vehicle. This results in impaired vision of the driver which constitutes a driving hazard as the visor swings back and forth, and it also results in the visor failing to shield the driver and other passengers in the vehicle from sunlight.

An objective of the present invention is to provide a simple and inexpensive position-holding assembly which serves to maintain the sun visor of a vehicle in any of an infinity of positions to which it may be set, even when the visor swinging assembly has become worn. This obviates the need for costly replacement of the visor assembly itself.

Another objective of the invention is to provide such a sun visor position-holding assembly for a motor vehicle which is readily adjustable to fit the sun visor assemblies of all standard vehicles.

BRIEF DESCRIPTION OF THE DRAWINGS

FIG. 5 is an end view of the position-holding assembly of FIG. 3.

DETAILED DESCRIPTION OF THE ILLUSTRATED EMBODIMENT

Figure 1:
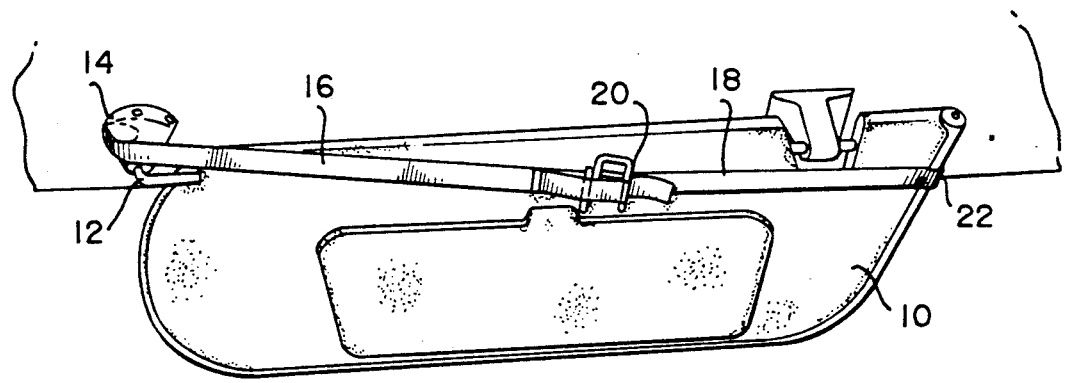
FIG. 1 is a perspective view of a sun visor in a typical motor vehicle on which the position-holding assembly of the invention has been mounted, the visor being shown in its normal turned-down front position adjacent to the windshield of the vehicle.
Figure 2:
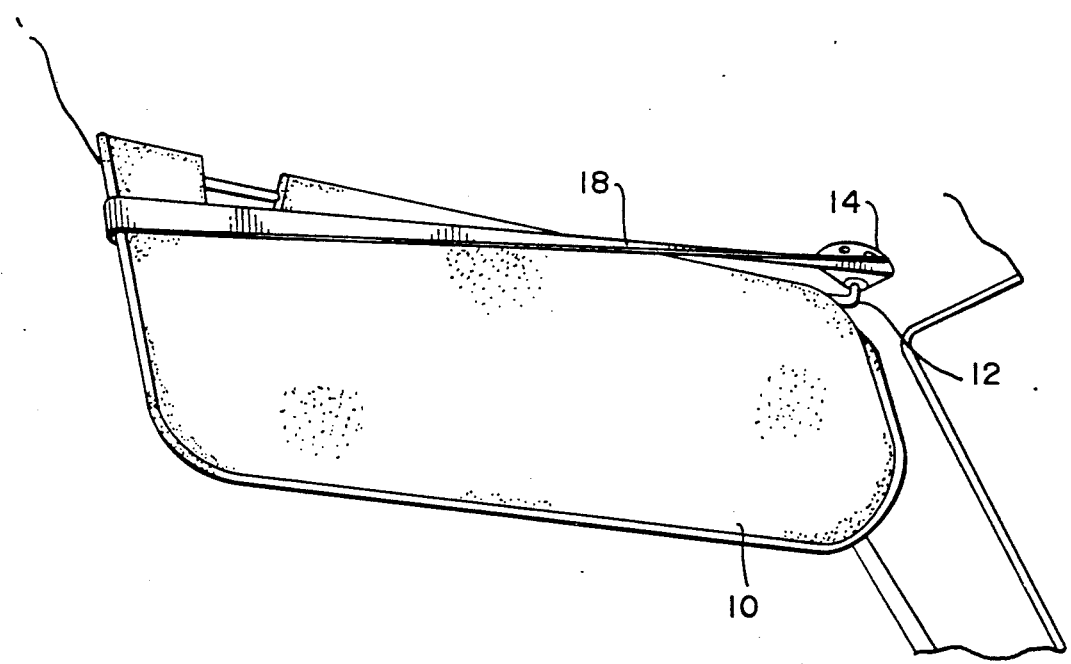
FIG. 2 is a perspective view of the visor of FIG. 1 after having been swung to a position adjacent to the side window of the vehicle.

As shown in FIGS. 1 and 2, the sun visor 10 of a motor vehicle is mounted on an elongated bar 12. Bar 12 has a right-angled vertical end portion which is permanently attached to a ceiling mounting bracket 14 for rotation about a vertical axis. Frictional resistance between the right-angled end portion of bar 12 and the ceiling mounting bracket 14 resists the turning of the vertical end portion of the elongated bar 12 and serves to hold the sun visor in the position set by the vehicle occupant. The construction of sun visors, such as sun visor 10, and the manner in which such visors are mounted in the bracket 14 of a motor vehicle, are well known and well understood in the art.

As shown in FIGS. 1 and 2, visor 10 can swing from the position of FIG. 1 in which it extends down adjacent to the windshield of the motor vehicle, to the position of FIG. 2 in which it partially covers one of the side windows of the vehicle. As is also well understood, it is usual practice to adjust the visor to various angular positions between the positions of FIGS. 1 and 2 in order to shield the occupants of the motor vehicle from the direct rays of the sun.

After the visor assembly has been use for some period of time, the seat in bracket 14 and the end of the vertical portion of bar 12 become worn, and the visor assembly is no longer firmly held in its various positions to which it has been set by the occupant. Instead, and as mentioned above, the visor assembly has a tendency to move to and fro with the motion of the motor vehicle.

The assembly of the present invention comprises two flexible bands 16 and 18 of unequal lengths, with each band having sufficient length to fit any standard sun visor assembly. One end of each of the bands 16 and 18 is clamped between ceiling and the base of bracket 14. The longer band 18 is looped around a brake and guide clip 22 which is clamped to the far end of the sun visor 10. The other ends of bands 16 and 18 are held together by a buckle 20, or other adjustable fastener, such as a turn buckle. The buckle 20, or other adjustable fastener, serves to adjust the tension of the bands 16 and 18. This adjustable feature of the bands 16 and 18 serves to adapt the assembly of the invention to different sizes of visors for different types of motor vehicle. The bands 16 and 18 may be made of any appropriate material, metal, plastic or fabric.

The tension of the bands 16 and 18 enables band 18 to exert pressure on the brake and guide clip 22. The clip 22 serves as a brake to hold the sun visor assembly in the position on the arcuate path between the windshield and side window as set by the occupant of the vehicle. For a 90° swing of the sun visor 14, the travel of the braking clip 22 on the inside surface of band 18 is determined by the distance between the center line cf the vertical end portion of bar 12 which extends into ceiling bracket 14 and the outside edge of the base of the ceiling bracket where the band 18 is anchored.

The brake and guide clip 22 is clamped on the distal end of sun visor 10 for guiding and braking band 18. The clip may be formed of any appropriate metal, plastic or other material, and it is adapted to be clamped onto sun visors of different thicknesses. The braking and guide clip 22 moves along the inner surface of band 18, as the visor 10 is moved from the position of FIG. 1 to the position of FIG. 2.

Figure 3:
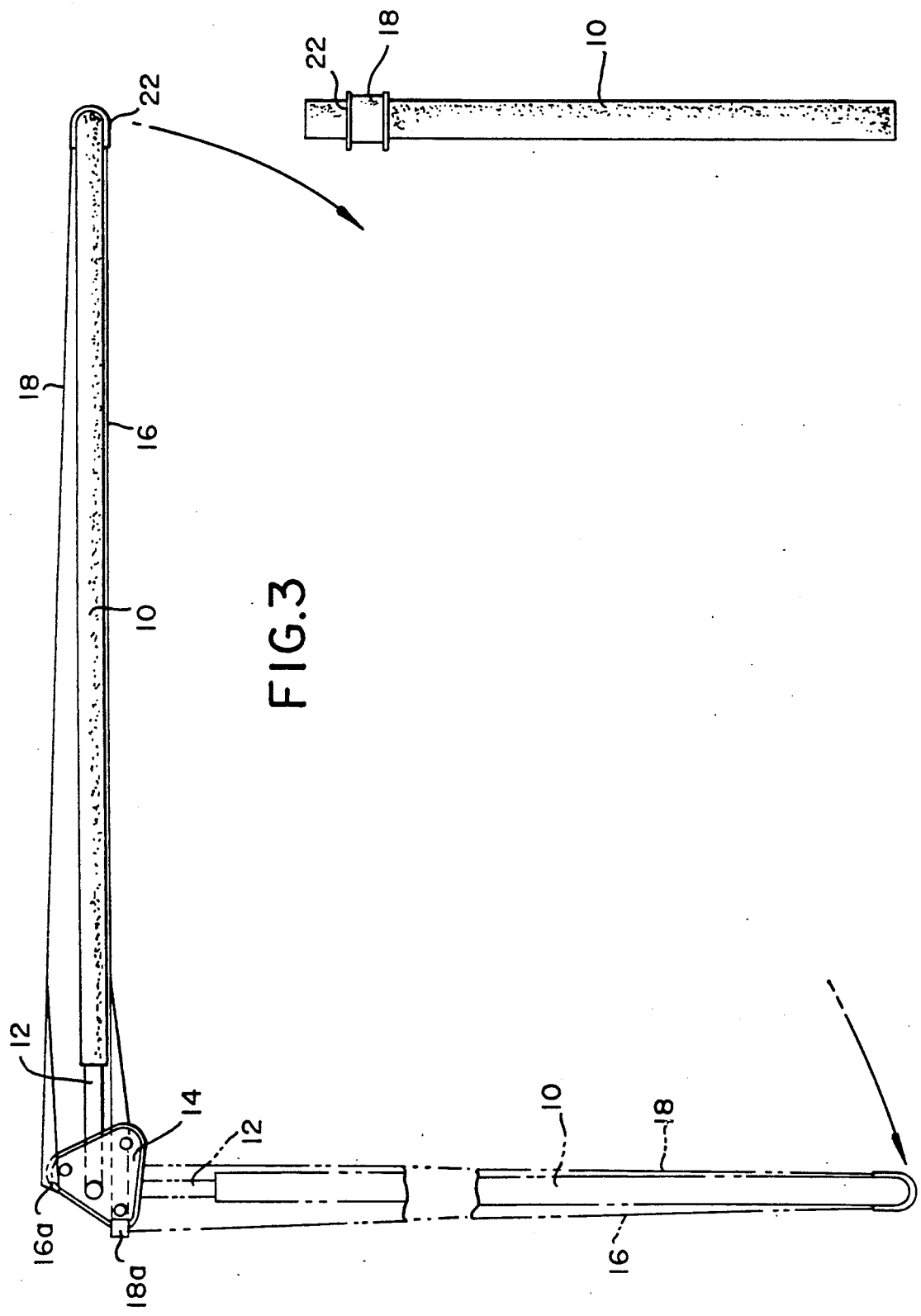
FIG. 3 is a top turned-down plan view of the position-holding assembly of the invention mounted on a typical sun visor.
Figure 4:
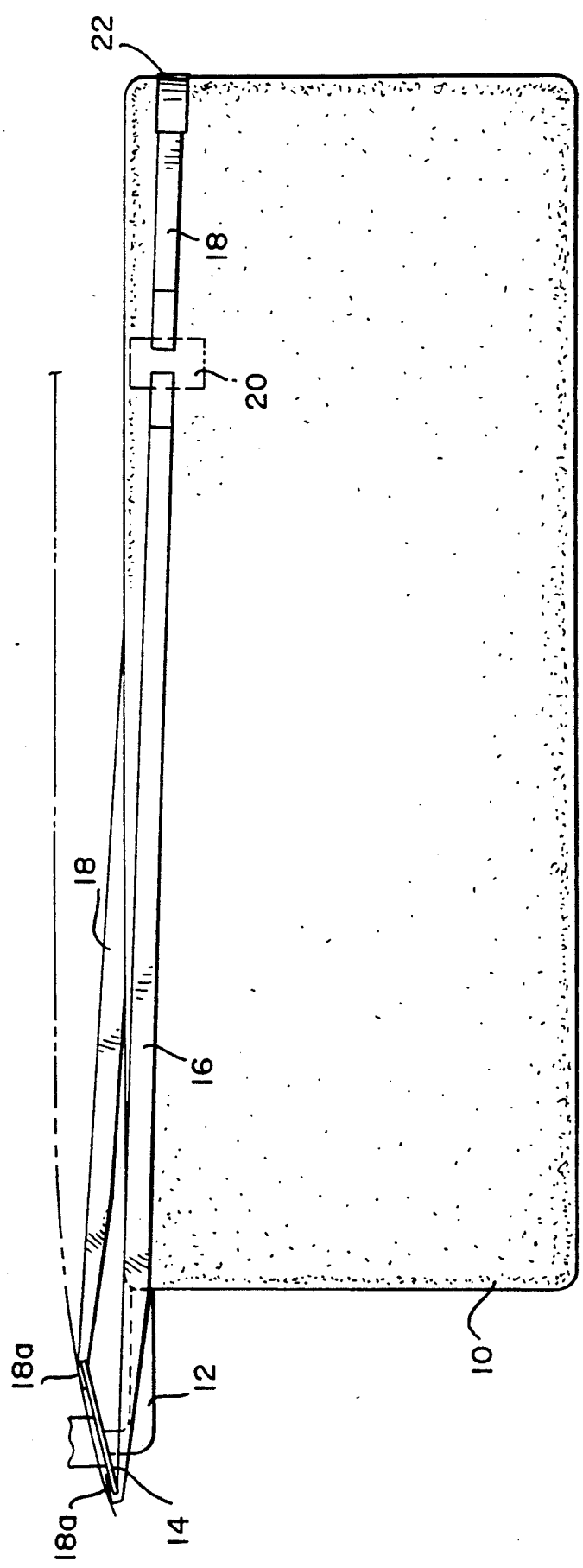
FIG. 4 is a front turned-down view of a visor like the visor of FIG. 1 with the position-holding assembly of the invention attached.

Details of the sun visor position and holding assembly of the invention are shown particularly in FIGS. 3, 4 and 5. As shown in FIGS. 3 and 4, the respective ends of bands 16 and 18 are clamped under the base of bracket 14. The bands 16 and 18 may have metal ends 16a and 18a to facilitate the mounting of the bands under the bracket 14.

As best shown in FIG. 4, the end of band 18 is clamped by bracket 14 at a pivot point displaced from the vertical axis of rotation of bar 12; and the end of band 16 is clamped by bracket 14 at a pivot point displaced from the pivot point of band 18 and also from the vertical axis of rotation of bar 12. Accordingly, when the visor 10 is turned in bracket 14 about the vertical axis from the position of FIG. 1 to the position of FIG. 2, the braking clip 22 moves along the inner surface of band 18. When the fastener 20 is tightened sufficiently, the band 18 will resist any to and fro movement of the visor about the vertical axis, after it has been set to the desired position. Accordingly, the sun visor may be set to an infinity of angular positions between the windshield and the side window by the occupant, and the fastener 20 may be adjusted to provide sufficient tension to hold the visor in any selected one of the positions.)

The assembly of the invention may be easily installed, merely by removing or loosening bracket 14 from the ceiling of the vehicle, and inserting the ends 16a, 18a of the bands 16 and 18 between the base of the bracket and the ceiling of the vehicle, and then tightening the mounting screws of the bracket. The bands are looped around the distal end of the visor, as shown in the drawings, and are pulled tight by adjusting the fastener 20.

By the use of the simple and inexpensive assembly of the invention, when the original sun visor assembly has become worn and loose, the sun visor will be held in the position placed by the occupant of the vehicle.

It will be appreciated that while a particular embodiment of the invention has been shown and described, modifications may be made, and it is intended in the claims to cover all modifications which come within the true spirit and scope of the invention.

I claim:

1. An attachment for the sun visor assembly of a vehicle, the sun visor assembly including a bracket attached to the ceiling of the vehicle, an elongated bar having a right-angled vertical end portion extending into the bracket for rotation about a vertical axis, and a sun visor mounted on said elongated bar for rotation about a horizontal axis, said attachment comprising: a flexible band mounted on said visor and having its ends clamped under said bracket at first and second points displaced from said vertical axis and from one another, said band being looped around the end of said visor remote from said bracket so that when the visor is rotated about said vertical axis the remote end of said visor moves along the inner surface of said band, and said band being mounted on said visor with means providing sufficient tension to resist movement of said remote end of said visor along the inner surface of said band, thereby causing the visor to be held in the angular position to which it is set about said vertical axis by the occupant of the vehicle.

2. The attachment defined in claim 1, in which said flexible band comprises a first band and a second band each having one end clamped under said bracket with the first band being looped around the remote end of said visor, and said means being an adjustable fastener securing the other ends of said first and second bands together.

3. The attachment defined in claim 2, in which said first band is longer than said second band.

4. The attachment defined in claim 2, and which includes rigid clips attached to the respective ends of said bands clamped under said bracket.

5. The attachment defined in claim 1, and which includes a braking clip clamped to the remote end of said visor with said flexible band being looped around said braking clip.

* * * * *